US007539972B2

(12) United States Patent
Wang et al.

(10) Patent No.: US 7,539,972 B2
(45) Date of Patent: May 26, 2009

(54) METHOD OF IMPROVING USER INTERACTION WITH AN OBJECT MANAGEMENT TOOL

(75) Inventors: Wendy Wan-Ju Wang, Cupertino, CA (US); Yi Wang, San Jose, CA (US); Ming-Ching Yee, San Jose, CA (US); Ariel Hadass, Palo Alto, CA (US); Gil Mati Sheinfeld, Sunnyvale, CA (US)

(73) Assignee: Cisco, Technology Inc., San Jose, CA (US)

( * ) Notice: Subject to any disclaimer, the term of this patent is extended or adjusted under 35 U.S.C. 154(b) by 249 days.

(21) Appl. No.: 11/506,498

(22) Filed: Aug. 18, 2006

(65) Prior Publication Data
US 2008/0127050 A1 May 29, 2008

(51) Int. Cl.
*G06F 9/44* (2006.01)
(52) U.S. Cl. ..................................... 717/105
(58) Field of Classification Search ......... 717/105–108, 717/113, 144; 715/734–736, 764, 804, 810, 715/835; 709/204, 218, 224, 216; 707/3, 707/102
See application file for complete search history.

(56) References Cited

U.S. PATENT DOCUMENTS

| 2003/0034998 A1* | 2/2003 | Kodosky et al. | 345/736 |
| 2003/0184595 A1* | 10/2003 | Kodosky et al. | 345/810 |
| 2005/0050196 A1* | 3/2005 | Aita et al. | 709/224 |
| 2006/0031768 A1* | 2/2006 | Shah et al. | 715/735 |

OTHER PUBLICATIONS

USPTO; PCT International Search Report PCT/US2007/75411; Mail date Jul. 15, 2008; 3 Pages.

* cited by examiner

*Primary Examiner*—Tuan Anh Vu
(74) *Attorney, Agent, or Firm*—Stolowitz Ford Cowger LLP

(57) ABSTRACT

Methods and systems for improving user interaction with an object management tool are described. An objects tracking panel is displayed. The objects tracking panel includes a visual representation of one or more objects. Also, the objects tracking panel includes a visual representation of the relationships between the objects. A newly created object is detected. In response to the newly created object, the visual representation of one or more objects is updated to reflect the addition of the newly created object. Furthermore, the visual representation of relationships between the objects is updated to reflect the addition of the newly created object.

5 Claims, 12 Drawing Sheets

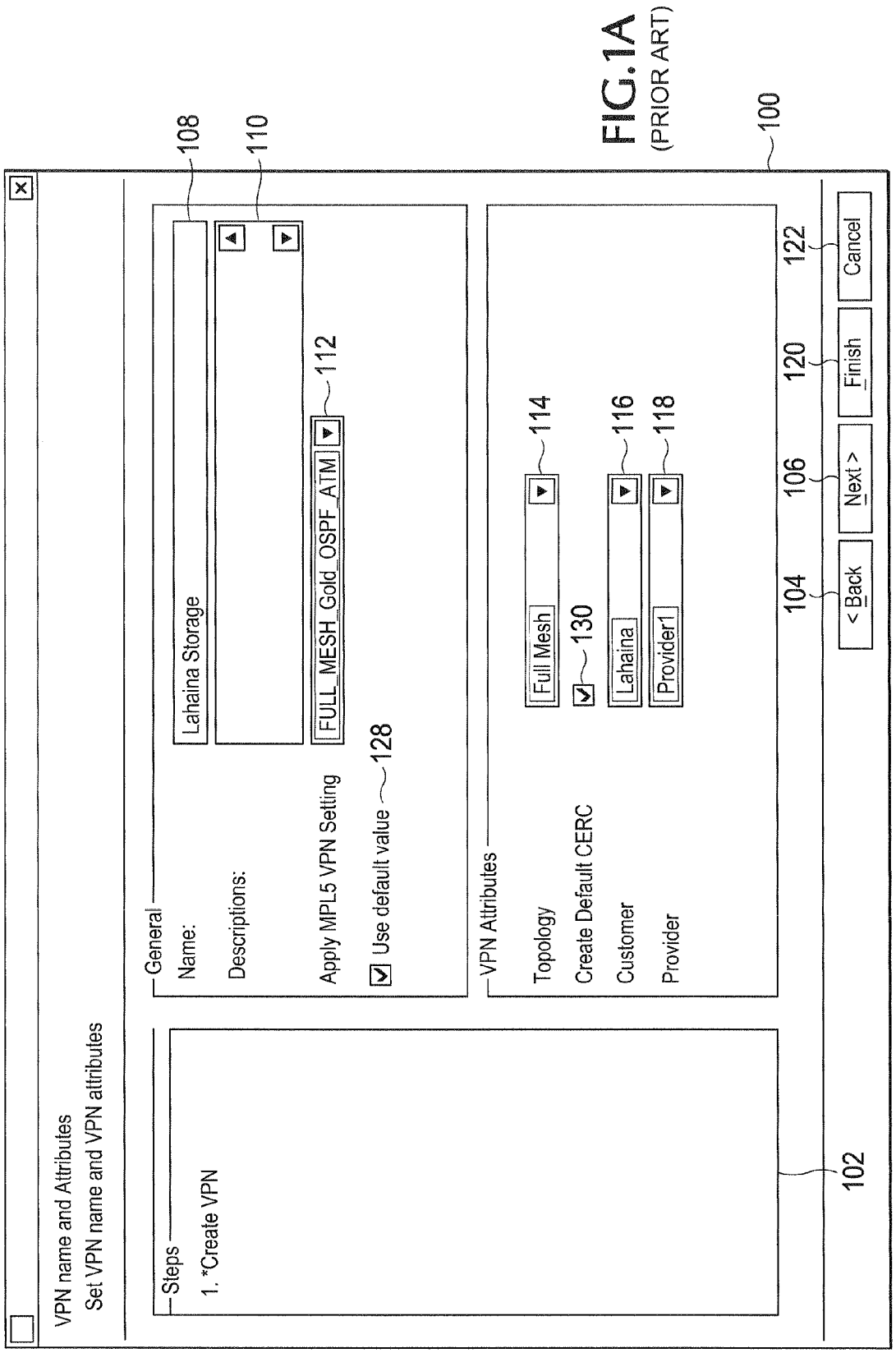

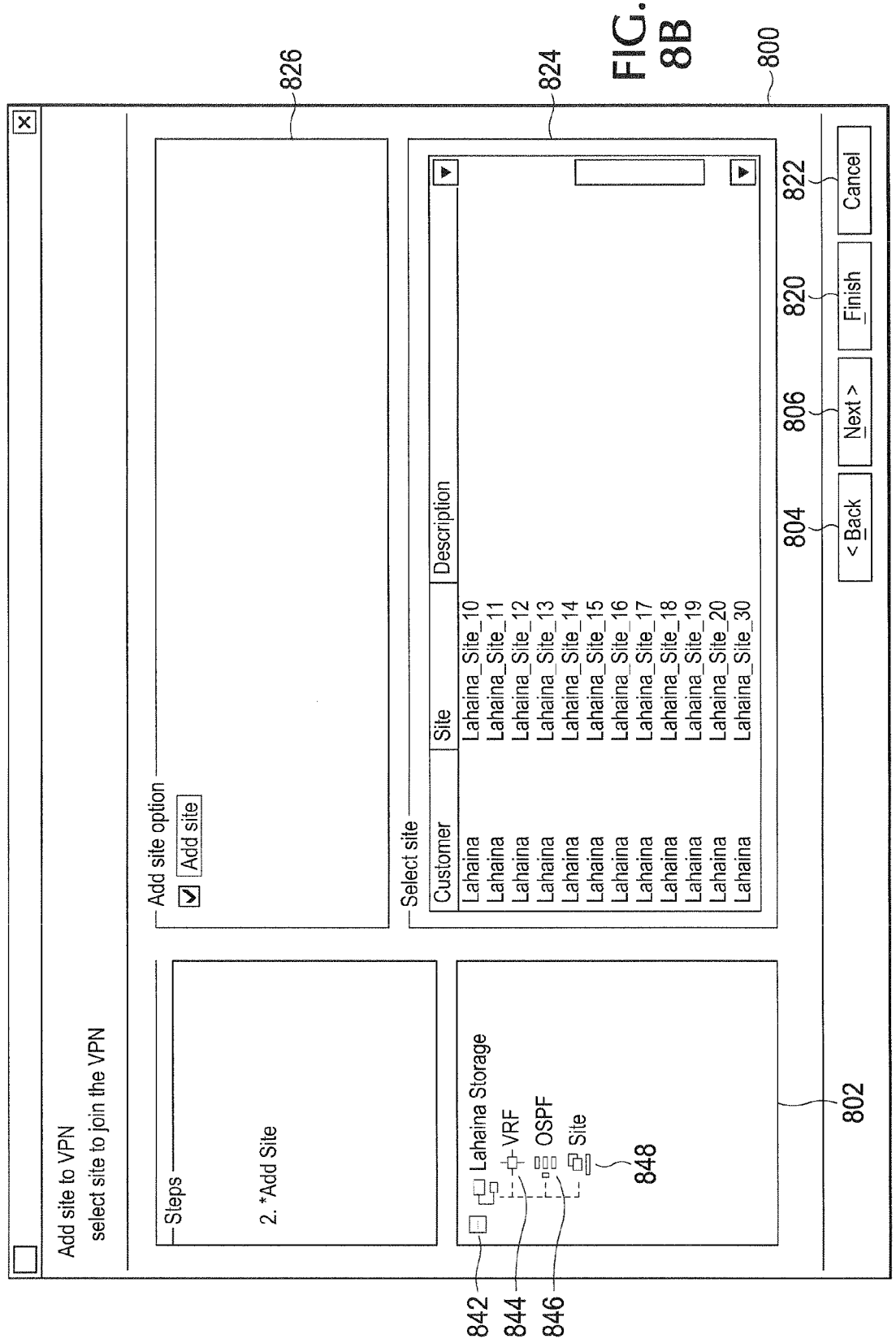

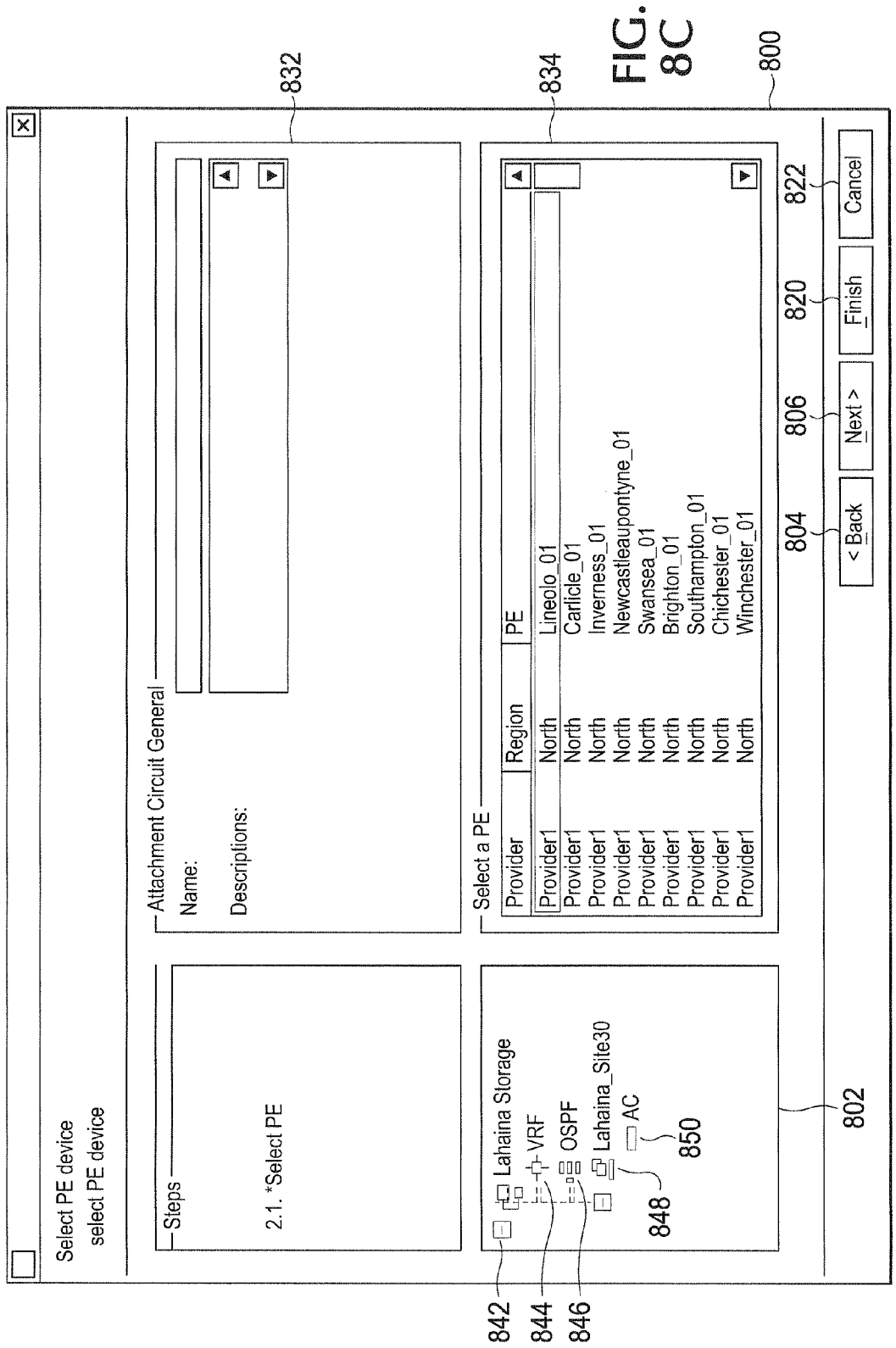

METHOD OF IMPROVING USER INTERACTION WITH AN OBJECT MANAGEMENT TOOL

TECHNICAL FIELD

Embodiments generally relate to methods and systems for improving user interaction with an objects management tool.

BACKGROUND

Within the field of software design, object-oriented programming is a popular paradigm. The idea is that a software program may be seen as comprising a collection of individual building blocks, or objects, that act on each other, as opposed to a traditional view in which a program may be seen as a collection of functions, or simply as a list of instructions to a computer. A software object or building block, like a real life object, is capable of receiving messages from another object, processing data, and sending messages to other objects. In fact, a software building block can be viewed as an independent machine or actor with a distinct role or responsibility. Thus, a software program may be viewed as a collection of objects that interact with one another.

Because of the flexibility and maintainability that object-oriented programming offers, it is popular with large scale software engineering, such as network design. As these large scale software engineering projects are often highly complex and involves creating and managing numerous software building blocks, a number of management tools or "wizards" have been made to help software designers manage the software building blocks.

However, conventional wizards or management tools do not track or show created objects. Consequently, a software designer can lose track of what they are creating while working with the wizard. Moreover, conventional wizards do not provide software engineers with access to the created objects until the whole wizard is finished. As a result, details of a created object are not accessible during the design process. Furthermore, the relationships between the objects are not shown with existing wizards, making it difficult for a software designer to visualize the connections and/or interactions between different objects.

FIGS. 1A, 1B, and 1C illustrate a prior art network objects wizard in operation. FIG. 1A, corresponds to the first step of this process and illustrates a graphical user interface (GUI) of a network wizard 100. The wizard 100 includes a navigation panel 102, which shows a list of steps that a user takes. FIG. 1A also includes a back button 104 for moving to a previous screen, a next button 106 for moving onto the next screen, a finish button 120, and a cancel button 120. Furthermore, FIG. 1A includes a Name section 108, descriptions section 110, MPLS VPN setting section 112, use default value section 128, topology section 114, create default CERC section 130, a customer section 116, and a provider section 118. In this example, a user is to create a new virtual private network (VPN) by configuring VPN related attribute values. Also, the user adds Site to the VPN by configuring Attachment Circuit to join the VPN.

Referring now to FIG. 1A, user enters "Lahaina Storage" into the name section 108 and clicks the next button 106 to advance to the next step, illustrated in FIG. 1B. FIG. 1B corresponds to the second step of this process and includes navigation panel 102, add site option panel 126, and select site panel 124.

With reference to FIG. 1B, the user is advanced to the "Add site" step. In this step, a user can add a site to join "Lahaina Storage" VPN. In this step, internally "Lahaina Storage" VPN is configured with VRF and OSPF routing protocol. However, wizard 100 does not provide an object visualization means to reflect that "Lahaina Storage" VPN containing VRF and OSPF are build as output of step 1. After the user adds "Lahaina_Site30" to "Lahaina Storage" VPN, the user clicks on the next button 106 to advance to step 3, illustrated by FIG. 1C.

FIG. 1C corresponds to step 3 and includes an attachment circuit general panel 132 and a select a PE panel 134. Again, FIG. 1C of conventional wizard 100 does not visually reflect that in step 2, "Lahaina_Site_30" is added to "Lahaina Storage" VPN. In step 3, the user constructs the Attachment Circuit by selecting a PE for "Lahaina_Site_30" to connect. Here, the user connects "Lahaina_Site_30" to "Lincoln_01". Again, the wizard 100 fails to provide visualization to the connection between "Lahaina_Site_30" and "Lincoln_01".

With the conventional wizard 100, the user would continue on for the rest of the wizard steps without any means of visualizing the created network objects or the connections between the created network objects. As a result, the relationships and interconnections between network objects that have been built are obscure and hard to follow. Hence, the effectiveness of a network designer is negatively impacted by the lack of intuitive visualization means.

BRIEF DESCRIPTION OF THE DRAWINGS (PRIOR ART) FIGS. 1A, 1B, and 1C illustrate a prior art network objects wizard in operation.

Figure 8A:
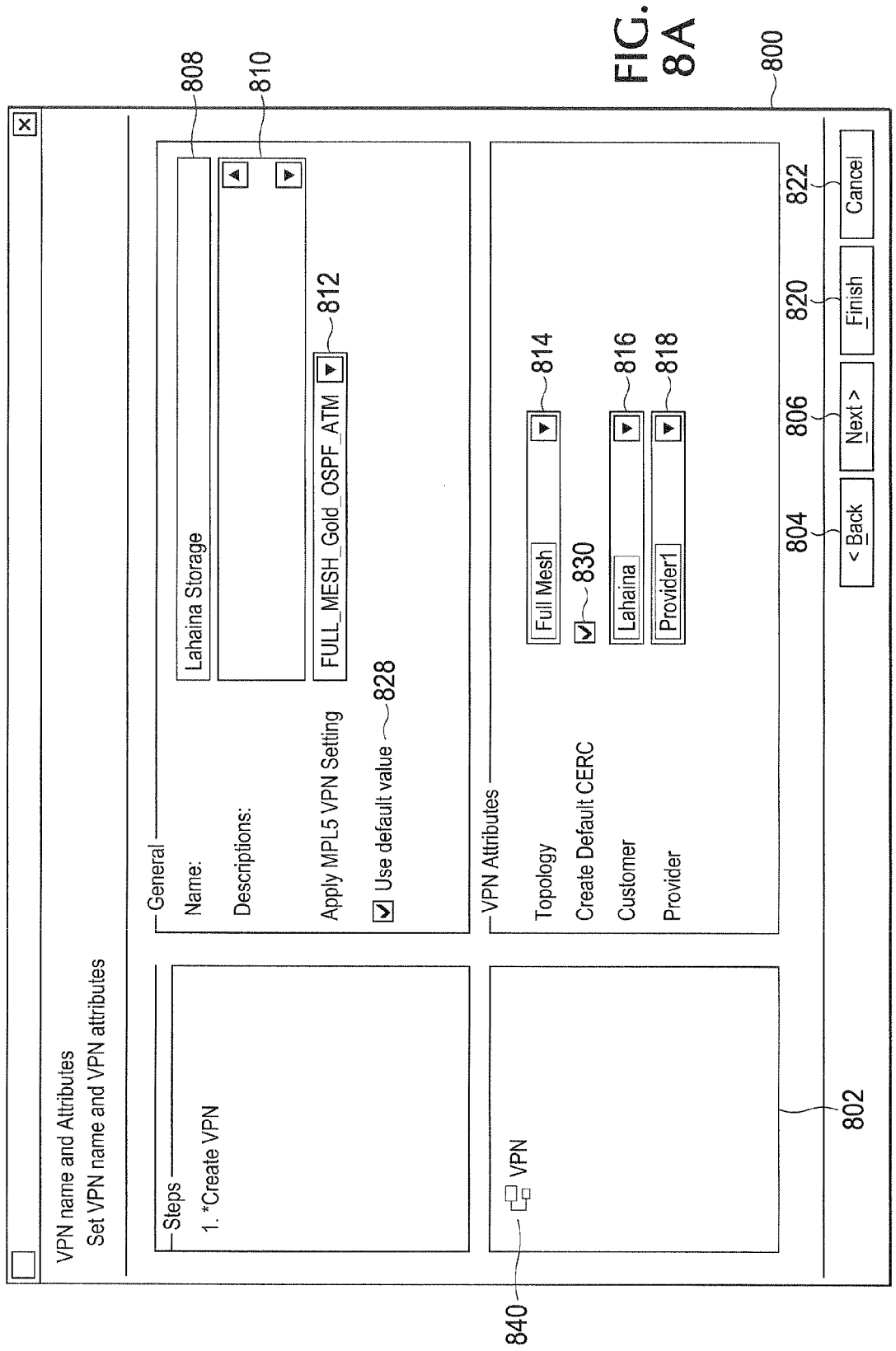

FIGS. 8A, 8B, and 8C illustrate a network objects wizard with an objects tracking panel in operation, in accordance with an embodiment of the present claimed subject matter.

Figure 9:
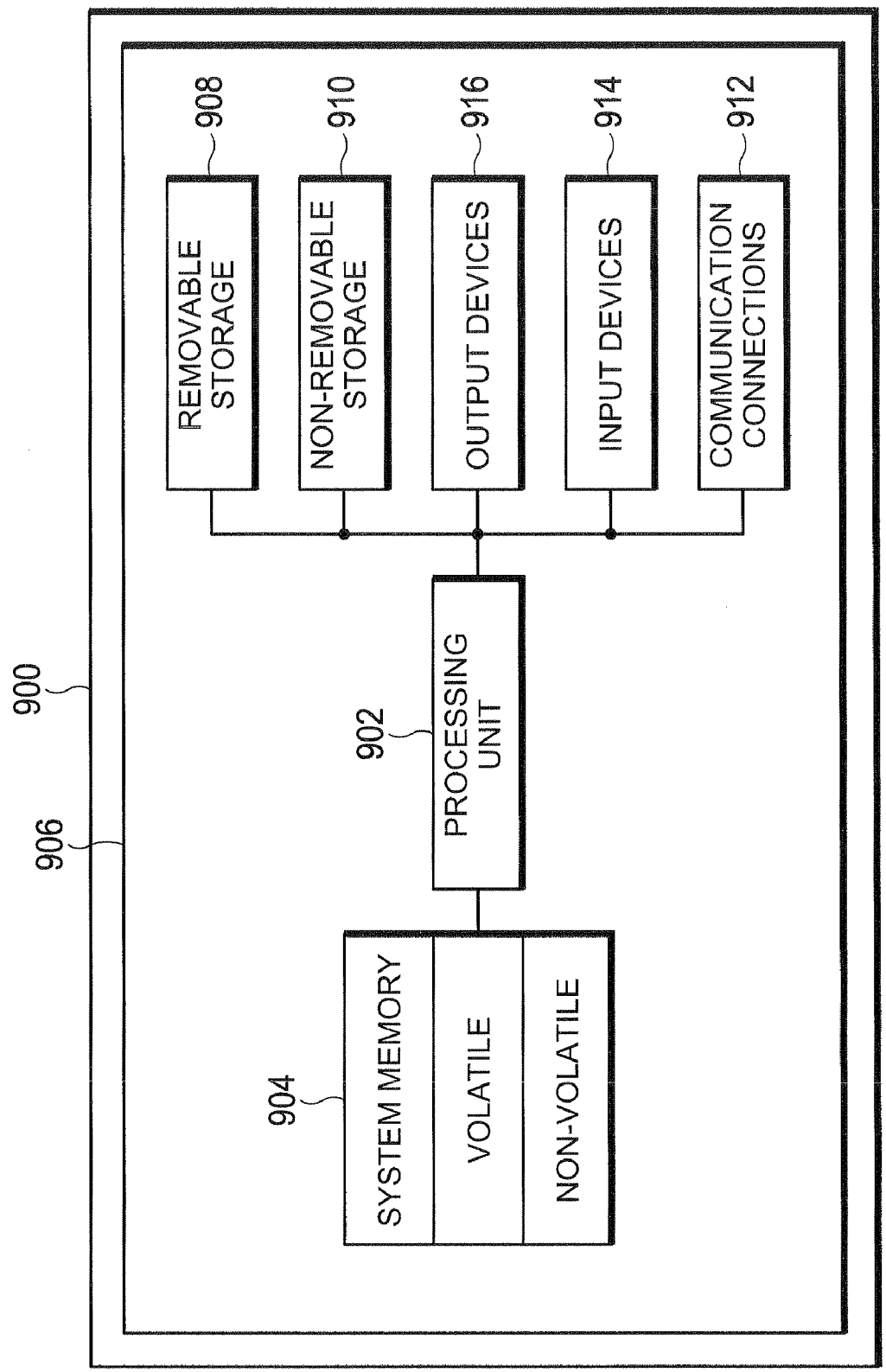

FIG. 9 illustrates an exemplary system for implementing the claimed subject matter includes a computing device, such as computing device 900, in accordance with an embodiment of the present claimed subject matter.

DETAILED DESCRIPTION OF THE DRAWINGS

Reference will now be made in detail to embodiments of the present claimed subject matter, examples of which are illustrated in the accompanying drawings. While the claimed subject matter will be described in conjunction with these embodiments, it will be understood that they are not intended to limit the claimed subject matter to these embodiments. On the contrary, the claimed subject matter is intended to cover alternatives, modifications and equivalents, which can be included within the spirit and scope of the claimed subject matter as defined by the appended claims. Furthermore, in the following detailed description of the present claimed subject matter, numerous specific details are set forth in order to provide a thorough understanding of the present claimed subject matter. However, it will be evident to one of ordinary skill in the art that the present claimed subject matter can be practiced without these specific details. In other instances, well known methods, procedures, components, and circuits have not been described in detail as not to unnecessarily obscure aspects of the claimed subject matter.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, bytes, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "setting," "storing," "scanning," "receiving," "sending," "disregarding," "entering," or the like, refer to the action and processes of a computer system or similar electronic computing device, that manipulates and transforms data represented as physical (electronic) quantities within the computer system's registers and memories into other data similarly represented as physical quantities within the computer system memories or registers or other such information storage, transmission or display devices.

Efficient tracking and management of objects are valued in many fields. In one example, network management tools are widely used to simplify the network design process. Often, a network management "wizard" is used to help a user deal with the complex task of designing and keeping track of numerous network objects. However, traditional network management wizards, among other shortcomings, fail to provide users with an effective way to visually keep track of what he or she has created. Moreover, with traditional network management wizards, users are unable to access created network objects until the process is complete.

In response to this need, embodiments set forth methods and systems for improving user interaction with an object management tool. In one embodiment, a graphical user interface having an objects (e.g., software objects) tracking panel is described. In one embodiment, the objects tracking panel is integrated with a conventional network management wizard to allow network designers to track created network objects while he or she is still using the network management wizard. In one embodiment, the objects tracking panel allows a user to view and to access the objects (e.g., network objects) that the user is creating before the task is finished.

In one embodiment, the objects tracking panel is visually integrated into a network management tool. Further, in one embodiment, the objects tracking panel displays the objects (e.g., software objects) and the relationship between created objects as the objects are composed in the design process. Often, in the context of network design, a user needs to tie together different network objects in order to form a meaningful network service. Hence, embodiments greatly improve the way in which a user interacts with network objects by providing a visually intuitive interface from which he or she can construct a network service. In one example, the objects tracking panel shows each individual object that has been created and how the created objects are tied together.

Moreover, in one example, the objects tracking panel allows a user to select (e.g., double-click) on an object in the objects tracking panel to see the details of the selected object without affecting the flow of the design process. Also, in one embodiment, a user can issue commands (e.g., "ping" and/or "telnet") to created objects, such as created network objects. Furthermore, the size, location, and display format of the objects tracking panel are flexible and can be altered. For instance, the size of the objects tracking panel can be made larger or smaller. Also, in one instance, the objects can be displayed in a tree format or in an interactive map format using lines to illustrate connections between various objects. Additionally, in another instance, the objects tracking panel can be collapsed.

Further, it is important to note that embodiments are equally applicable to other fields. For example, embodiments can be utilized to track a user's progression through an on-line store. In particular, a user's checkout process on the on-line store can be effectively tracked and visualized.

Figure 1B:
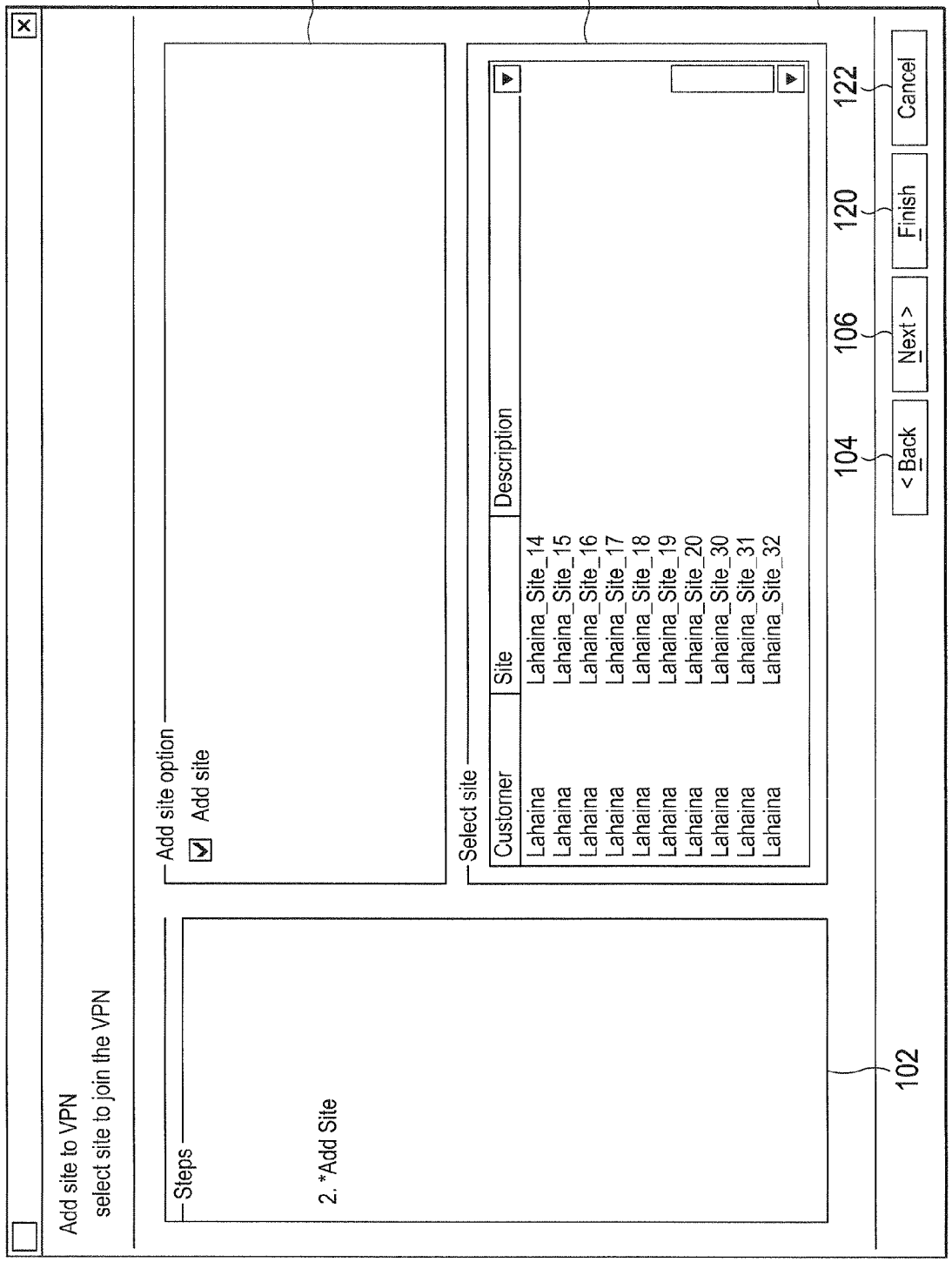
Figure 1C:
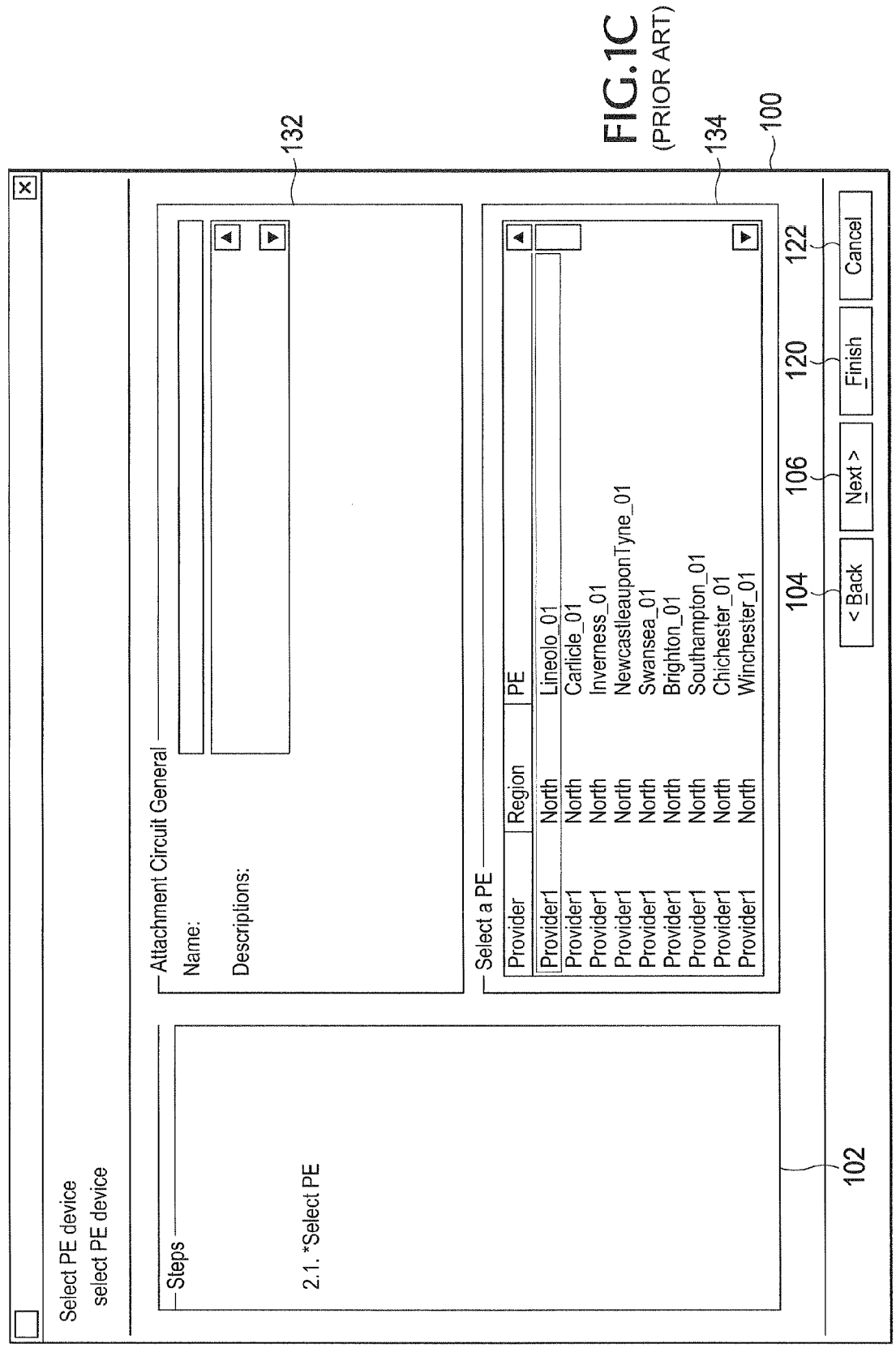
Figure 2:
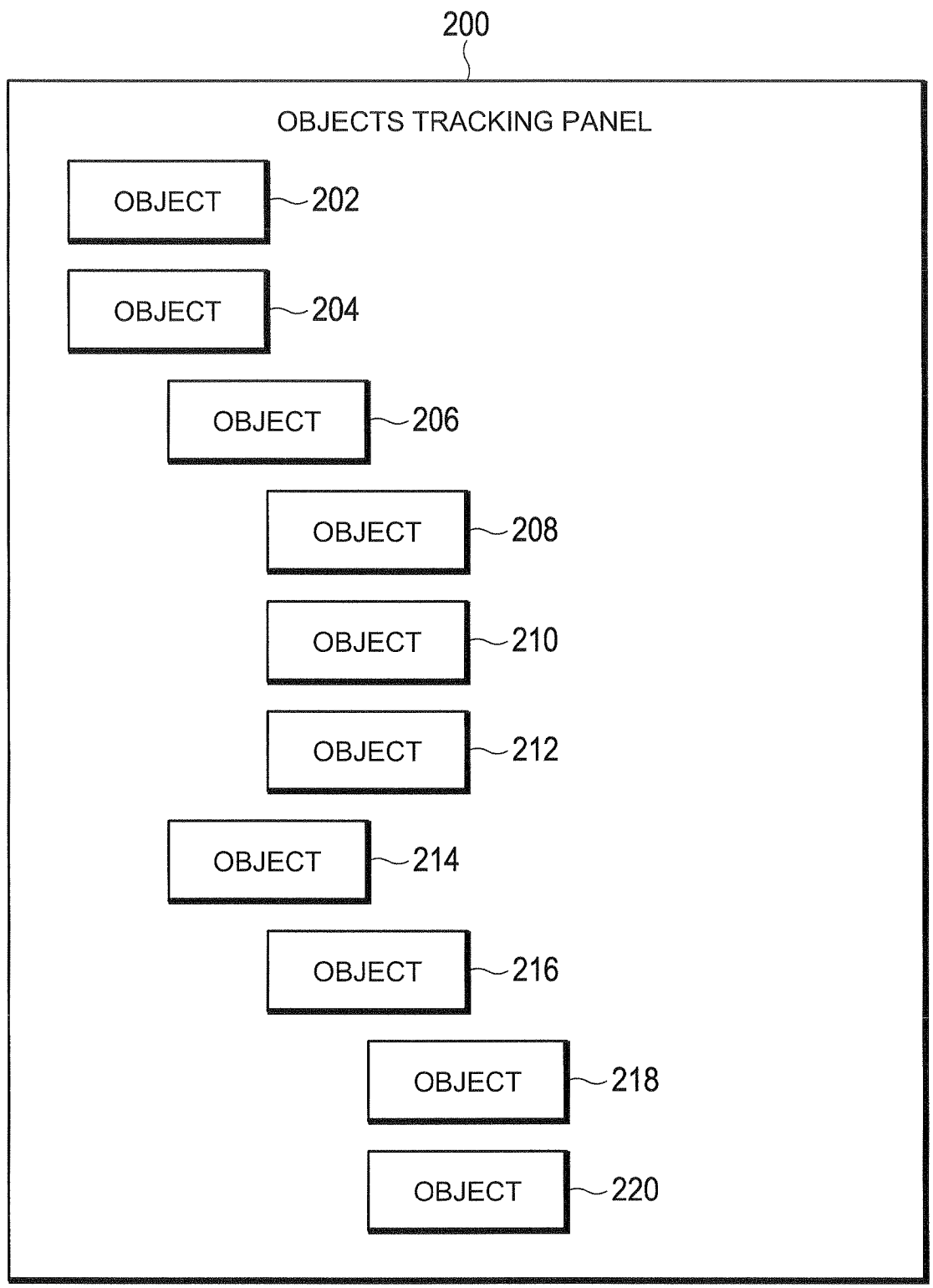
FIG. 2 illustrates block diagrams of an exemplary objects tracking panel, in accordance with an embodiment of the present claimed subject matter.

FIG. 2 illustrates block diagrams of an exemplary objects tracking panel 200, in accordance with an embodiment of the present claimed subject matter. Objects tracking panel 200 includes object 202, object 204, object 206, object 208, object 210, object 212, object 214, object 216, object 218, and object 220. Although objects tracking panel 200 is shown and described as having certain numbers and types of elements, the embodiments are not necessarily limited to the exemplary implementation. That is, objects tracking panel 200 can include elements other than those shown, and can include more than one of the elements that are shown.

The objects can be network objects, application program objects, web-based objects, and/or other types of objects. The organization of objects in the objects tracking panel 200 may, in one example, correspond to the order in which the objects are created. For example, object 202 may be the first object created and is displayed on the top left corner. Object 204 may be created immediately after object 202 and is displayed immediately below object 202. Similarly, object 206 may be created immediately after object 204 and is correspondingly displayed immediately below object 204. Also, the amount of indentation assigned to each individual object can be utilized to further visually illustrate relationships between objects. Furthermore, different from conventional approaches, a user can select an object to see details of the selected object. In one example, a user double-clicks on object 206. In response to the user selection, a pop-up window appears displaying details associated with object 206 while not disrupting the object design process.

It is important to note that embodiments are not limited to network objects but in fact can be applied to different types of reusable objects in different contexts. In one instance, embodiments are applied to a web interface that records progress through a series of steps a user has taken on a website so that a user can know what has been done up to a certain point. For example, embodiments can be applied to a checkout process on an online store context such that a user can see which steps are completed. For instance, while a first object may be related to shipping cost, a second object may be related to a user's mailing address. A connection may be shown to indicate the relationship shipping cost and the user's mailing address.

Figure 3:
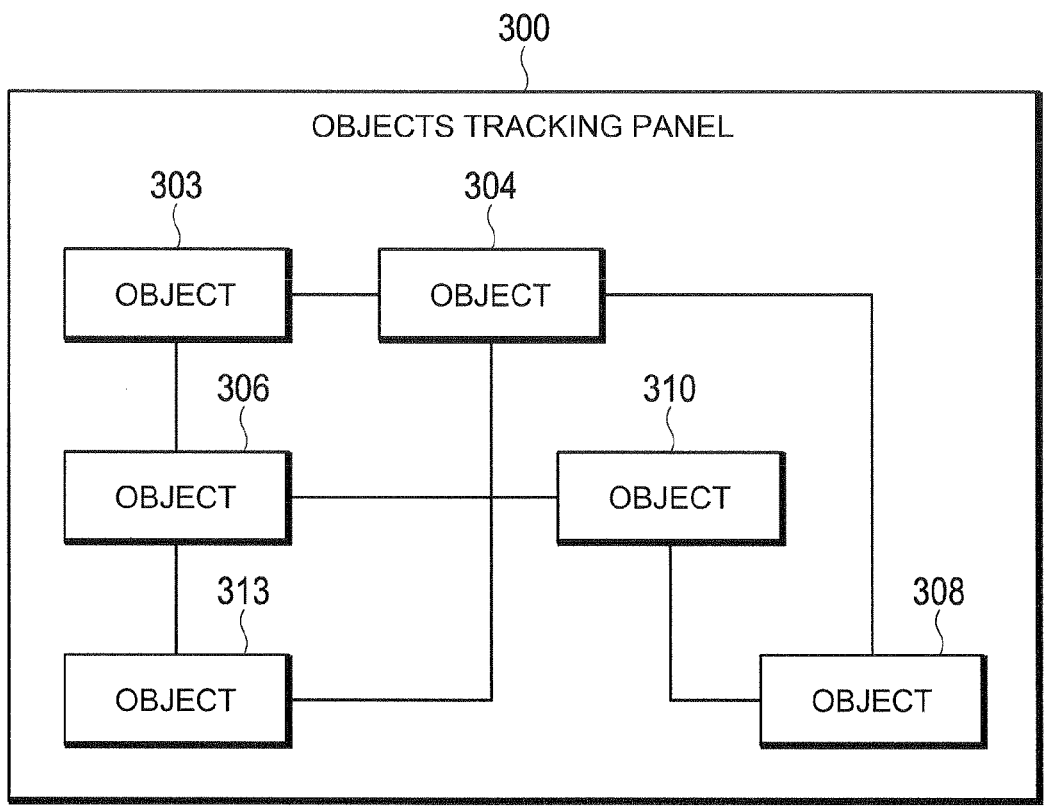
FIG. 3 illustrates block diagrams of an objects tracking panel displaying an interactive map of objects, in accordance with an embodiment of the present claimed subject matter.

FIG. 3 illustrates block diagrams of an objects tracking panel 300 displaying an interactive map of objects, in accordance with an embodiment of the present claimed subject matter. Objects tracking panel 300 includes object 303, object 304, object 306, object 308, object 310, and object 313.

Objects tracking panel 300 displays objects in an interactive map format that illustrates the connections and relationships between the objects. For example, it is easy to see from the objects tracking panel 300 that object 303 and object 310 are indirectly connected via object 306. Also, objects tracking panel 300 shows that object 303 is connected to object 304 directly but also indirectly by going first to object 306, then object 313, and finally to object 304. Furthermore, if an object, such as object 306, is deleted, it is simple for a user to see that object 303 loses its connection to object 310.

In this way, the relationships between different objects (e.g., application program objects) are illustrated in a straightforward manner. New additions as well as deletions are displayed in a format that allows a user to see a holistic view.

Figure 4:
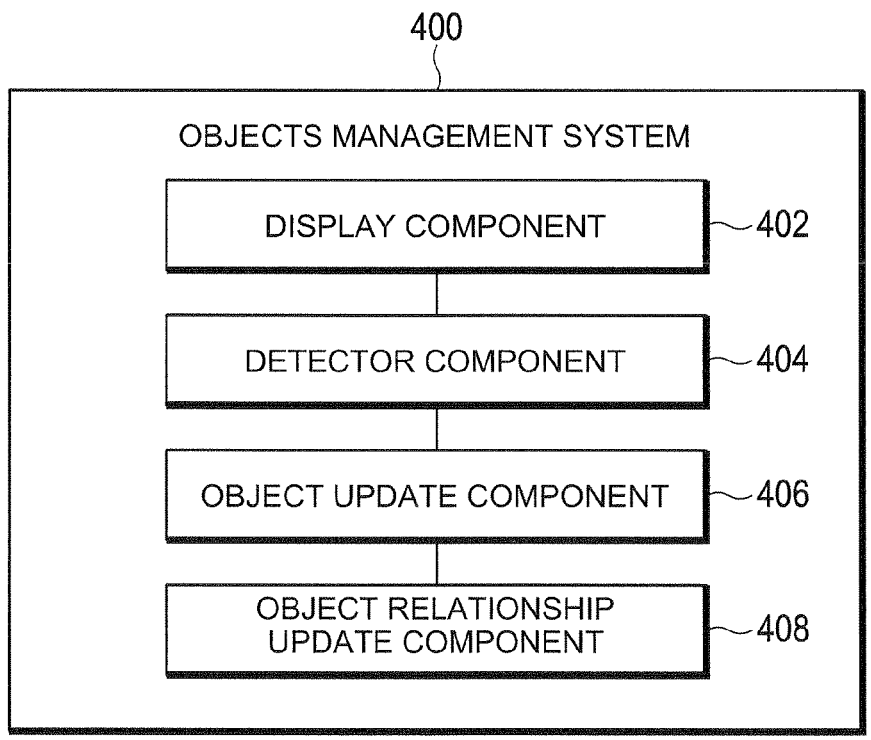
FIG. 4 illustrates block diagrams of an objects management system, upon which embodiments can be implemented.

FIG. 4 illustrates block diagrams of an objects management system 400, upon which embodiments can be implemented. Objects management system 400 includes a display component 402, a detector component 404, an object update component 406, and an object relationship update component 408.

It is important to note that FIG. 4 is only a conceptual illustration of how the different components can interact. Embodiments are not limited by the arrangement and/or design of objects management system 400. Also, certain elements are shown as distinct elements for the sake of conceptual clarity. In implementation, one or more elements may be combined. For example, object update component 406 for updating graphical representation of one or more objects and object relationship component 408 for updating graphical representation of relationships between the objects are shown as two separate elements. However, embodiments can function properly when the two components are combined.

Further, although objects management system 400 is shown and described as having certain numbers and types of elements, the embodiments are not necessarily limited to the exemplary implementation. That is, objects management system 400 can include elements other than those shown, and can include more than one of the elements that are shown.

In one embodiment, the components of objects management system 400 (e.g., a network objects management system, an application program objects management system, and/or a web-based objects management system) cooperatively operate to efficiently improve user interaction with an objects management tool. The display component 402 displays an objects tracking panel, such as objects tracking panel 200 illustrated in FIG. 2. In one embodiment, the display component 402 is customizable by a user to display objects in different formats. The objects tracking panel comprises a graphical representation of one or more objects. Also, the objects tracking panel comprises a graphical representation of the relationship between objects.

In addition, coupled with the display component is a detector component 404 configured to detect newly created objects. Moreover, if a newly created object is detected, a first object update component 406 updates the graphical representation of one or more objects as to reflect the addition of the newly created object. Furthermore, a second object relationship update component 408 updates the graphical representation of relationships between the objects as to reflect the addition of the newly created object.

Figure 5:
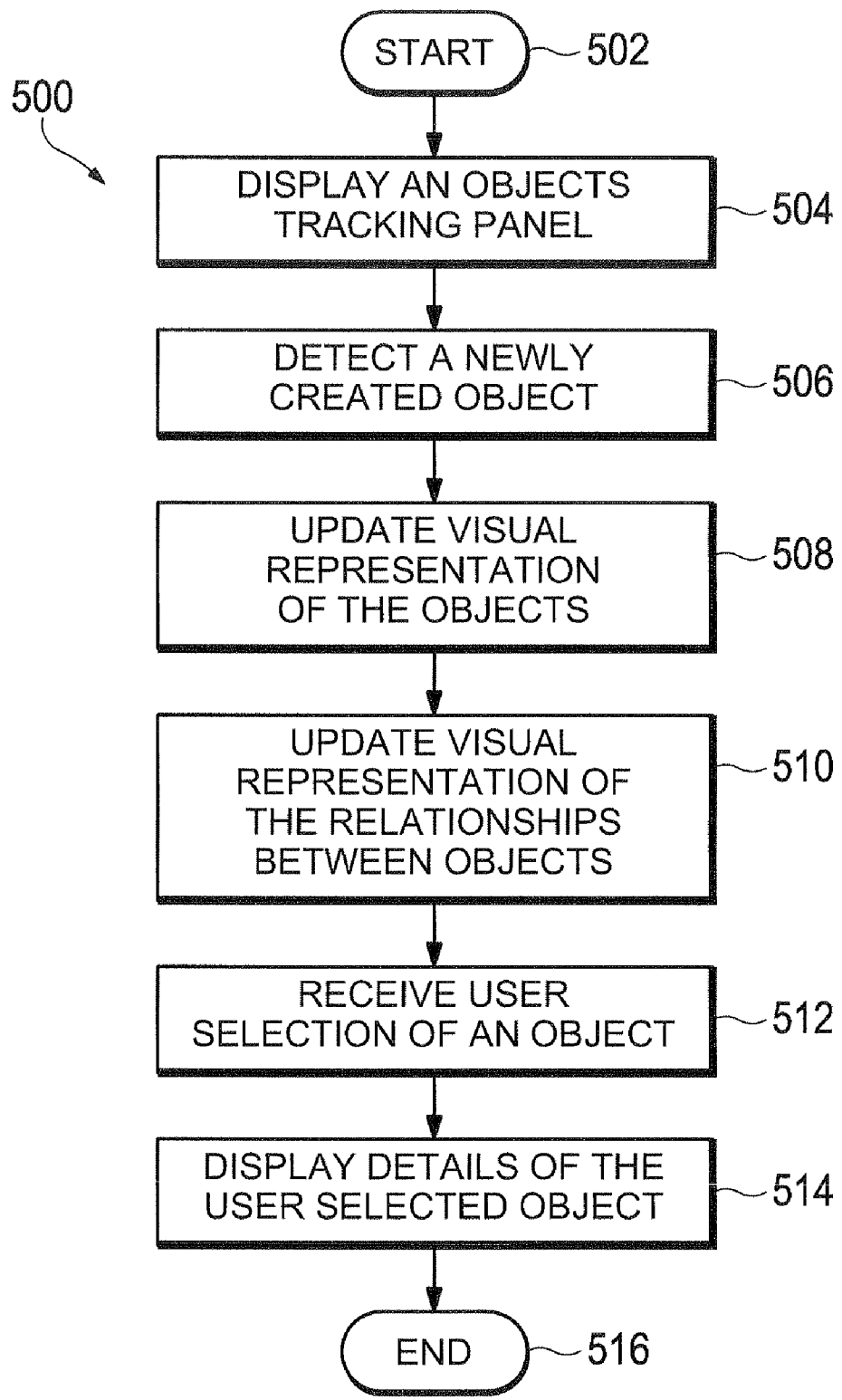
FIG. 5 illustrates a flowchart of a method for improving user interaction with an object management tool, upon which embodiments in accordance with the present claimed subject matter can be implemented.

FIG. 5 illustrates a flowchart 500 of a method for improving user interaction with an object (e.g., software object) management tool, upon which embodiments in accordance with the present claimed subject matter can be implemented. Although specific steps are disclosed in flowchart 500, such steps are exemplary. That is, embodiments of the present claimed subject matter are well suited to performing various other or additional steps or variations of the steps recited in flowchart 500. It is appreciated that the steps in flowchart 500 can be performed in an order different than presented.

At block 502, the process starts. At block 504, an objects tracking panel is displayed. The objects (e.g., software objects) tracking panel includes a visual representation of one or more objects. Also, the objects tracking panel includes a visual representation of the relationships between one or more objects. In one embodiment, the objects tracking panel is resizable. In one embodiment, the objects tracking panel allows a user to issue commands to the one or more objects. In one embodiment, the visual representation of one or more objects comprises an objects tree. In one embodiment, the visual representation of one or more objects comprises an interactive objects map.

At block 506, a newly created object (e.g., software object) is detected. A newly created object can be a network object, an application program object, a web-based object, and/or other types of objects. At block 508, in response to the newly created object, visual representations of the objects are updated. For example, a new icon corresponding to the newly created object is generated and displayed on an objects tracking panel. At block 510, visual representations of the relationships between objects are updated.

In one example, the update may be as simple as adding showing a visual connection to the newly created object (e.g., software object). In another example, the addition of the newly created object may have impacted the relationships between other existing objects and thus require a more comprehensive update to reflect the changes in the ties and connections between objects.

At block 512, user selection of an object (e.g., a network object) is received. At block 514, details of the user selected object is displayed. In one embodiment, details of the user selected object are displayed in a pop-up window. At block 516, the process ends.

Figure 6:
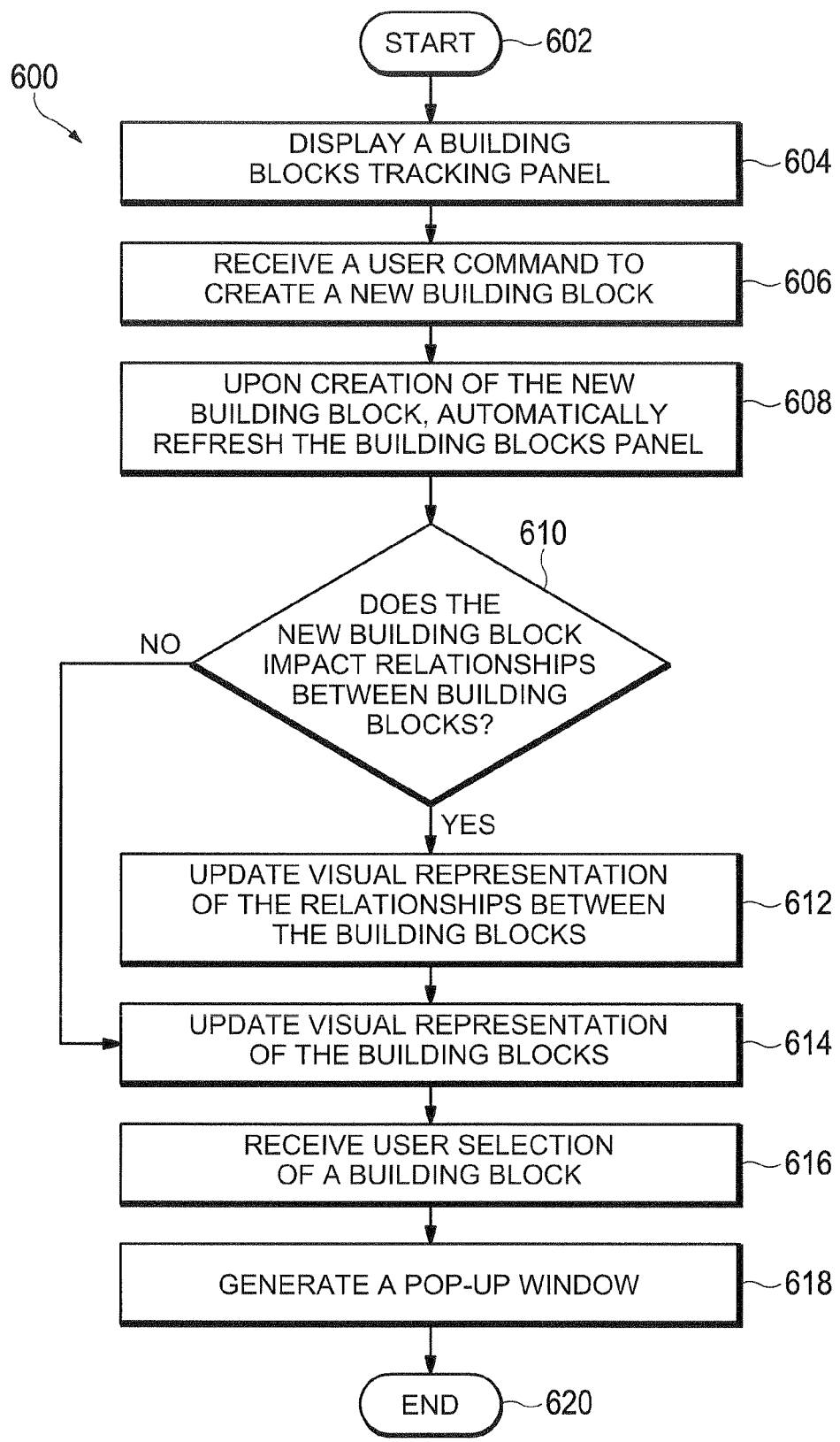
FIG. 6 illustrates a flowchart of a method for managing building blocks, upon which embodiments in accordance with the present claimed subject matter can be implemented.

FIG. 6 illustrates a flowchart 600 of a method for managing building blocks, upon which embodiments in accordance with the present claimed subject matter can be implemented. Although specific steps are disclosed in flowchart 600, such steps are exemplary. That is, embodiments of the present claimed subject matter are well suited to performing various other or additional steps or variations of the steps recited in flowchart 600. It is appreciated that the steps in flowchart 600 can be performed in an order different than presented.

At block 602, the process starts. At block 604, a building blocks tracking panel having a number of existing building blocks is displayed. The relationships between the existing building blocks are illustrated in the building blocks tracking panel. In one example, a line connecting two building block may indicate that the two objects are communicatively coupled. In another example, a line connecting two building blocks may indicate that a change in one building block can impact the connected building block. In this way, if a user sees a building block that has numerous connections originating from it, the user can easily know that changes made to this particular building block may cause impacts on numerous other building blocks.

At block 606, a user command is received to create a new building block, such as a application program building block. It is important to note that embodiments are not limited to network building blocks, but can be equally applicable to various types of reusable building blocks or objects. At block 608, the building blocks tracking panel is automatically refreshed as to reflect the addition of the new building block. For example, a new icon corresponding to the new building block is displayed.

At block 610, it is determined whether the new building block impact relationships between building blocks. If it is determined that the new building block impact relationships between building blocks, then the process progresses to block 612. Otherwise, the process progresses to block 614. In one embodiment, determining is implemented by a processor.

At block 612, the visual representations of relationships between the building blocks are updated, At block 614, the visual representations of the building blocks are updated.

At block 616, user selection of a building block is received. At block 618, a pop-up window is generated. The pop-up window displays detail information of the selected building block. At block 620 the process ends.

Figure 7:
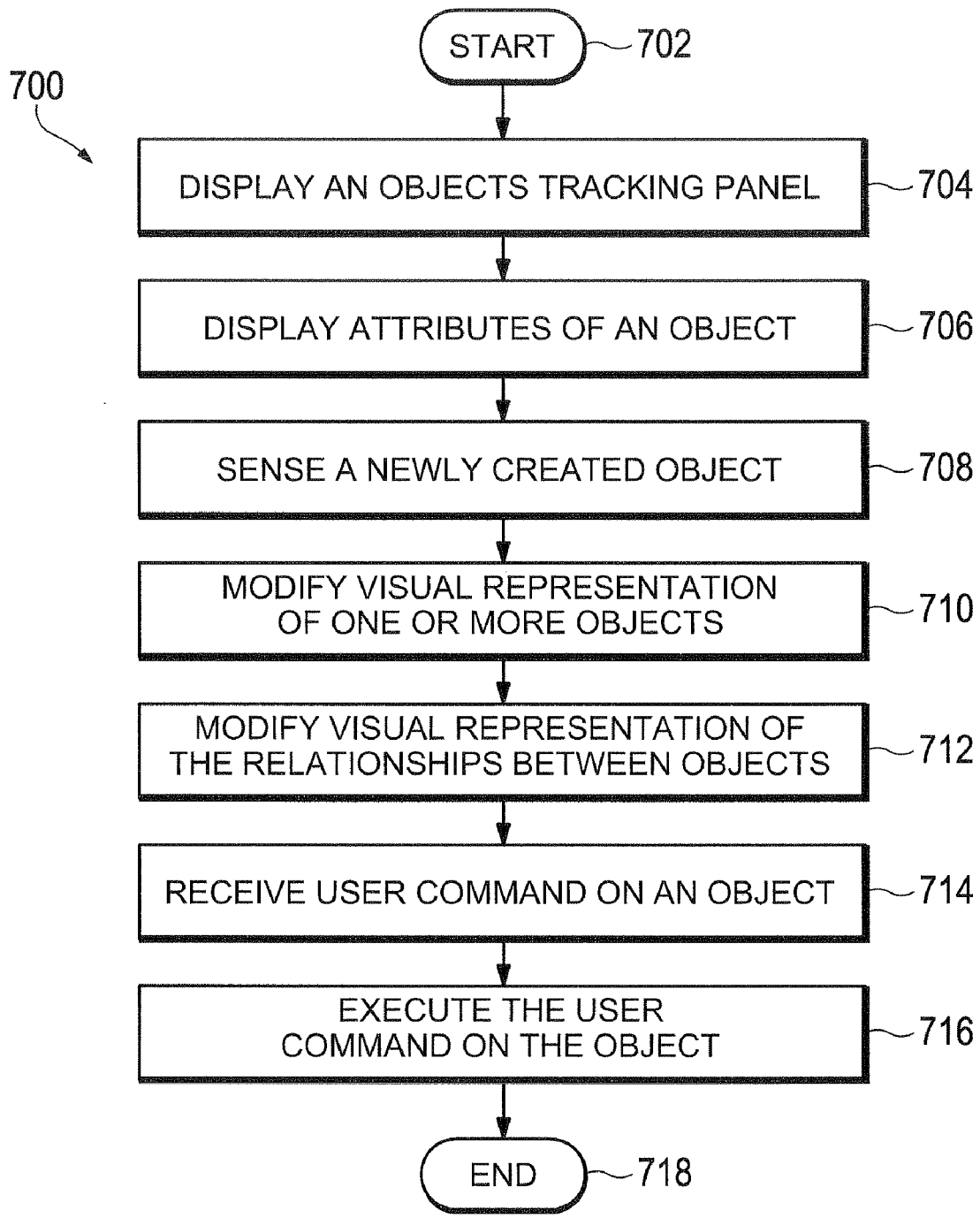
FIG. 7 illustrates a flowchart of a method for managing objects, upon which embodiments in accordance with the present claimed subject matter can be implemented.

FIG. 7 illustrates a flowchart 700 of a method for managing objects, upon which embodiments in accordance with the present claimed subject matter can be implemented. Although specific steps are disclosed in flowchart 700, such steps are exemplary. That is, embodiments of the present claimed subject matter are well suited to performing various other or additional steps or variations of the steps recited in flowchart 700. It is appreciated that the steps in flowchart 700 can be performed in an order different than presented.

At block 702, the process starts. At block 704, an objects tracking panel is displayed. In one embodiment, the objects tracking panel includes a visual representation of one or more objects. Also, the objects tracking panel includes a visual representation of the relationship between objects. In one embodiment, the objects tracking panel is integrated with a web browser and the objects tracking panel facilitates tracking of web-based objects. Moreover, in one embodiment, the objects tracking panel is resizable by a user.

At block 706, attributes of an object is displayed. At block 708, a newly created object is sensed. In one embodiment, the sensing is effectively instantaneous. In another embodiment, the sensing is time delayed. At block 710, visual representations of one or more objects are modified to reflect the addition of the newly created object. Also, different colors, shapes, font, and/or other types of visual representations may be utilized to indicate the status or state of objects. Similarly, different colors, lines, shapes, patterns, shading, formatting, font, and/or other types of visual representations may be utilized to indicate the relationship status or connection state between objects.

At block 712, visual representations of the relationships between objects are modified to reflect the addition of the newly created object. At block 714, user command on an object is received. At block 716, user command on the object is executed. At block 718, the process ends.

FIGS. 8A, 8B, and 8C illustrate a network objects wizard with an objects tracking panel in operation, in accordance with an embodiment of the present claimed subject matter. FIG. 8A corresponds to the first step of a network design process and illustrates a graphical user interface (GUI) of a network wizard 800.

The wizard 800 includes an objects tracking panel 802, which shows objects that the user has created as well as the relationships between created objects. FIG. 8A also includes a back button 804 for moving to a previous screen, a next button 806 for moving onto the next screen, a finish button 820, and a cancel button 820. Furthermore, FIG. 8A includes a Name section 808, descriptions section 810, MPLS VPN setting section 812, use default value section 828, topology section 814, create default CERC section 830, a customer section 816, and a provider section 818.

In this example, a user is to create a new virtual private network (VPN) by configuring VPN related attribute values. The objects tracking panel 820 on the left bottom corner of the network objects wizard provides the visualization of objects created by a user. Also, the relationships between objects are displayed. In particular, a VPN icon 840 is displayed in the objects tracking panel 820.

Referring still to FIG. 8A, user enters "Lahaina Storage" into the name section 808 and clicks the next button 806 to advance to the next step, illustrated in FIG. 8B. FIG. 8B corresponds to the second step of this process and includes objects tracking panel 802, add site option panel 826, and select site panel 824.

With reference to FIG. 8B, the user is advanced to the "Add site" step. In this step, a user can add a site to join "Lahaina Storage" VPN. In this step, internally "Lahaina Storage" VPN is configured with VRF and OSPF routing protocol. Network objects wizard 800 displays Lahaina Storage 842, VRF 844, OSPF 846, and Site 844 to show that "Lahaina Storage" VPN, VRF, and OSPF are built. Also, objects tracking panel 802 shows that a site 848, is to be added to the VPN as the output of "Add Site" step. Upon completion, the user clicks on the next button 806 to advance to step 3, illustrated by FIG. 8C. In one embodiment, a user can select an icon, such as VRF 844, by double-clicking it. In response to user selection, a pop-window is generated to display details of the selected object, VRF 844, in the pop-window. Also, in one embodiment, optional commands on the created objects can be issued from a context menu on the objects tracking panel without affecting the wizard steps.

FIG. 8C corresponds to step 3 and includes an attachment circuit general panel 832 and a select a PE panel 834. In step 3, the user builds an attachment circuit (AC). Again, the AC is visually represented as AC 850. Thus, in this manner, embodiments use visual representations to help a user keep track of which objects have been created. Also, embodiments make it simple for a user to see the relationships between created objects.

With reference to FIG. 9, an exemplary system for implementing the claimed subject matter includes a computing device, such as computing device 900, in accordance with an embodiment of the present invention. In its most basic configuration, computing device 900 typically includes at least one processing unit 902 and memory 904. Depending on the exact configuration and type of computing device, memory 904 may be volatile (such as RAM), non-volatile (such as ROM, flash memory, etc.) or some combination of the two. This most basic configuration is illustrated in FIG. 9 by dashed line 906. Additionally, device 900 may also have additional features/functionality. For example, device 900 may also include additional storage (removable and/or non-removable) including, but not limited to, magnetic or optical disks or tape. Such additional storage is illustrated in FIG. 9 by removable storage 908 and non-removable storage 910. Computer storage media includes volatile and nonvolatile, removable and non-removable media implemented in any method or technology for storage of information such as computer readable instructions, data structures, program modules or other data. Memory 904, removable storage 908 and non-removable storage 910 are all examples of computer storage media. Computer storage media includes, but is not limited to, RAM, ROM, EEPROM. flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 900. Any such computer storage media may be part of device 900.

Device 900 may also contain communications connection(s) 912 that allow the device to communicate with other devices. Communications connection(s) 912 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Device 900 may also have input device(s) 914 such as keyboard, mouse, pen, voice input device, touch input device, etc. Output device(s) 916 such as a display, speakers, printer, etc. may also be included. All these devices are well know in the art and need not be discussed at length here.

Embodiments help makes interaction with an object management wizard more user-friendly. In one example, as a user progresses through different steps of a wizard, the created objects are progressively displayed in an objects tracking panel, helping a user keep track of what has been created. Moreover, the relationships, ties, and/or connections between the different objects are illustrated as well. Further, a user can select a created object to see details regarding the created object. Hence, embodiments greatly improve user experiences with object management wizards.

In the foregoing specification, embodiments of the claimed subject matter have been described with reference to numerous specific details that can vary from implementation to implementation. Thus, the sole and exclusive indicator of what is, and is intended by the applicants to be the claimed subject matter is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method of visually displaying network changes made with a network objects interaction management tool, comprising:
    displaying an interactive map representing objects in the network in a software objects tracking panel, wherein the interactive map comprises;
        one or more graphical icons representing corresponding one or more objects in the network; and
        one or more graphical line connectors connecting the graphical icons based on the relationships between the one or more objects;
    receiving a user command to create a new object;
    detecting the newly created object;
    automatically refreshing the interactive map in response to the detection of the newly created object, wherein automatically refreshing comprises;
        generating a graphical icon representing the newly created object and including the newly generated graphical icon in the interactive map;
        visually indicating whether the addition of the newly created object affects other objects in the network by changing the color or shading of the graphical icons representing the affected other objects, or combinations thereof; and
        generating or removing, or combinations thereof, the graphical line connectors connecting the graphical icons to reflect changes in the relationships between the one or more objects in the network associated with the addition of the newly created object.

2. The method of claim 1, further comprising:
    receiving a user selection of a particular object of the one or more objects in the interactive map; and
    displaying details of the user selected particular object.

3. A method of graphically displaying and managing network application objects in an interactive application map, comprising:
    displaying the interactive application map in a network objects tracking panel for tracking changes to the application, wherein the changes comprise modification of one or more network objects of the application or creation of one or more network objects of the application, or combinations thereof;
    wherein the network objects are represented as corresponding graphical icons;
    wherein relationships between the one or more network objects are graphically illustrated in the interactive application map as graphical connector lines depicting relationships between the network objects;
    tracking a sequence of changes to the one or more network objects and graphically representing an order of the sequence as graphically displayed numbers in association with the graphical icons representing the changed one or more network objects;
    receiving a user command to change an existing network object or create a new network object;
    automatically refreshing the interactive application map in the network objects tracking panel to reflect the change to the existing network object or creation of the new network object, wherein automatically refreshing comprises adding, removing or changing, or combinations thereof, the corresponding graphical icon representing the existing network object or the new network object to graphically reflect the user command; and
    visually indicating whether the addition of the new network object or change to the existing network object affects any other network objects of the application, wherein the indication is a color change or shading of the graphical icons representing the affected other network objects of the application, or combinations thereof;
    wherein if a change to an existing network object or addition of a new network object impacts the relationship between the existing network objects, then displaying a modified illustration of the relationship between network objects by modifying the corresponding graphical connector lines.

4. The method of claim 3, further comprising:
    receiving a user selection of a network object displayed in the network objects tracking panel; and
    generating a pop-up window, wherein the pop-up window displays detail information of the selected network object.

5. An objects management system for interactively tracking changes to objects in a network, comprising:

a computer comprising:

a display component operable to;
- display a graphical network tree in an objects tracking panel, wherein the network tree comprises one or more graphical icons representing a corresponding one or more objects in the network, and wherein the network tree comprises one or more graphical line connectors representing one or more relationships between the one or more objects in the network;

a detector component for detecting a newly created object or deletion of an object from the network, or combinations thereof;

a first update component operable to respond to detection of a newly created object or deletion of an object, or combinations thereof, to automatically refresh the graphical network tree to reflect the addition of new objects or changes to existing objects in the network, wherein automatically refreshing comprises adding, changing or deleting the graphical icons responsive to changes to one or more objects in the network;

a second update component operable to respond to detection of a newly created object or deletion of an object, or combinations thereof, to automatically refresh the graphical network tree to reflect changes in relationships between graphically displayed objects in the network corresponding to addition of new objects or changes to existing objects in the network, wherein refreshing comprises adding, changing or deleting the graphical line connectors responsive to changes to one or more objects in the network; and a third update component operable to automatically refresh the graphical network tree to indicate whether the addition of the newly created object or the deletion of an object from the network affects any other objects in the network, wherein the indication is a color change or shading of graphical icons representing the affected other objects.

* * * * *

UNITED STATES PATENT AND TRADEMARK OFFICE
CERTIFICATE OF CORRECTION

| | | |
|---|---|---|
| PATENT NO. | : 7,539,972 B2 | Page 1 of 1 |
| APPLICATION NO. | : 11/506498 | |
| DATED | : May 26, 2009 | |
| INVENTOR(S) | : Wendy Wan-Ju Wang | |

It is certified that error appears in the above-identified patent and that said Letters Patent is hereby corrected as shown below:

At column 9, claim 1, line 65, please replace "comprises;" with --comprises:--.

Signed and Sealed this

Twenty-ninth Day of June, 2010

David J. Kappos
*Director of the United States Patent and Trademark Office*